July 14, 1942. J. BELINKINE 2,289,864

BRAKE LOAD INDICATOR FOR MOTOR VEHICLES

Filed Sept. 27, 1940

INVENTOR
Jules Belinkine
BY
ATTORNEY

Patented July 14, 1942

2,289,864

UNITED STATES PATENT OFFICE 2,289,864

BRAKE LOAD INDICATOR FOR MOTOR VEHICLES

Jules Belinkine, New York, N. Y., assignor to Alexandre Gurvitch, New York, N. Y.

Application September 27, 1940, Serial No. 358,618

1 Claim. (Cl. 264—1)

This invention relates to new and useful improvements in a brake load indicator for motor vehicles.

More specifically the invention proposes the construction of a brake load indicator characterized by a plurality of gauges positioned upon the dash board of a vehicle and certain of which are connected with apparatus in the vicinity of the wheels of the vehicle in a manner to indicate the force of inertia as caused by high acceleration or quick braking of the vehicle.

Still further it is proposed to arrange one of the gauges in such a way as to be self-contained so as to indicate the said inertia and be entirely dependent upon the sudden forward movement or the quick stopping of the vehicle body.

A further object of this invention proposes to arrange certain of the gauges in a fluid circuit of oil or other similar material which is not easily compressed and which will surge forwards or rearwards as the vehicle is moved quickly forwards or stopped for the purpose of causing the gauges to be set in motion to indicate the said inertia.

Still further it is proposed to have the fluid contained within a tank positioned adjacent each of the wheels of said vehicle in a manner to simultaneously indicate the inertia for each wheel for the purpose of determining whether or not each wheel is being properly braked upon the application of the foot lever contained within the vehicle.

Still further it is proposed to characterize the self-contained gauge arranged for indicating body inertia with a movable weight slidably mounted within the gauge and arranged in a manner to move either forwards or rearwards depending upon the movement of the car to simultaneously move a pointer to indicate the effect of the inertia.

A further object of this invention is the construction of a device as mentioned which is simple and durable and which may be manufactured and sold at a reasonable cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Figures 1, 2:
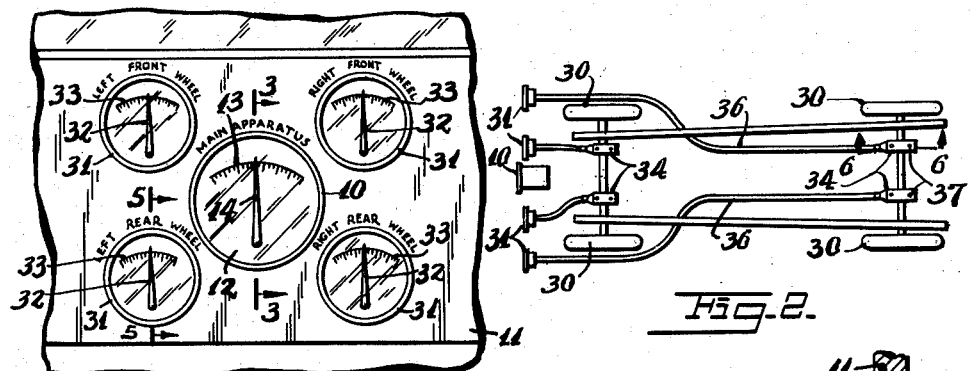
Fig. 1 is an elevational view of a portion of a dash board having brake load indicating gauges in accordance with this invention.
Fig. 2 is a schematic diagram of a vehicle chassis having a brake load indicator according to this invention applied thereto.
Figure 4:
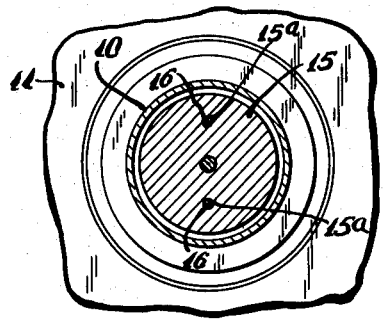
Fig. 4 is a vertical sectional view on the line 4—4 of Fig. 3.
Figure 3:
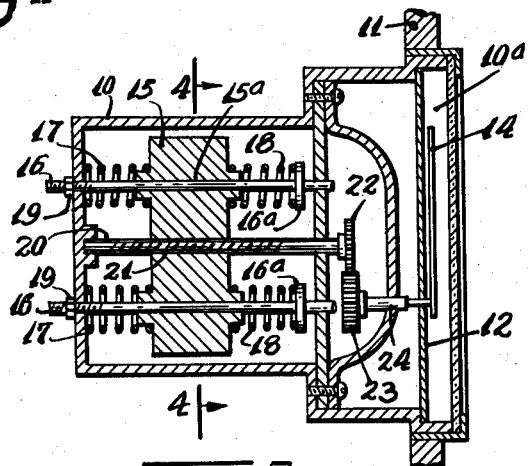
Fig. 3 is an enlarged vertical sectional view on the line 3—3 of Fig. 1.
Figure 5:
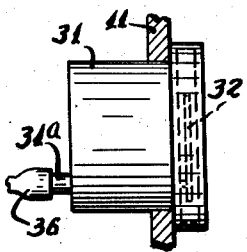
Fig. 5 is a vertical sectional view on the line 5—5 of Fig. 1.
Figure 6:
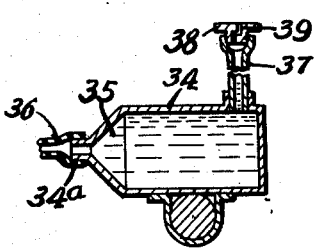
Fig. 6 is a vertical sectional view on the line 6—6 of Fig. 2.

The brake load indicator, according to this invention, includes a casing 10 for attachment upon the dash board 11 of a conventionally constructed vehicle. The casing 10 has an open front 10ª into which a face plate 12 is set. This face plate 12 carries a calibrated scale 13 across which a pivotally mounted pointer 14 acts for the purpose of indicating inertia as brought about by the high acceleration of the vehicle or the quick deceleration thereof. This pointer 14 is arranged to swing either to the right or left, depending upon whether it is being acted upon by high acceleration of the vehicle or quick stopping thereof. All instances of high acceleration will cause the pointer 14 to swing in one direction while all instances of sudden stopping will cause the pointer 14 to move in the opposite direction.

A mechanical means is provided for causing the pointer 14 to be moved either to the right or left and is characterized by a weight 15 mounted within the casing 10 and arranged in a line parallel to the straight forward travel of the vehicle. The weight 15 is slidably mounted to move in the said parallel line but to prevent rotation thereof. This slidable mounting comprises a pair of vertically spaced rods 16 also extended parallel to the straight forward travel of the vehicle and slidably extended through openings 15ª formed in the weight 15. Thus as the vehicle is either quickly accelerated or suddenly decelerated the weight 15 will either slide forwards or rearwards upon the rods 16.

Resilient means is provided for holding the weight 15 in a neutral central position upon the length of the rods 16. This means comprises a spring 17 for each of the rods 16 and each spring operates between the front face of the weight 15 and the adjacent face of the front wall of the casing 10. This means further comprises a spring 18 for each of the rods 16. These springs 18 operate between the rear face of the weight 15 and adjacent collars 16ª formed upon the rear ends of the rods 16. These springs 17 and 18 are coaxially mounted upon the rod 16 and each exerts a light pressure upon the weight 15 for holding the same longitudinally centered upon the rods 16. This centering is of course defined by the amount of space between the adjacent faces of the collar 16a and the front walls of the casing 10.

A means is provided for adjusting the position of the rods 16 with relation to the front wall of the casing 10 for the purpose of increasing the tension of the springs 17 and 18 to more readily hold the weight 15 in its neutral position. Each of the rods 16 is slidably supported on the casing 10, and slidably carries the weight 15. The free outer end of the rods 16 are provided with threads upon which a nut 19 is engaged for the purpose of bearing against the front face of the front wall of the casing 10. As the nut 19 is turned further on to the end of the rods 16, the collar 16a will be drawn closer to the front face of the casing 10 and so compress the springs 17 and 18 increasing the tension thereof.

A means is provided for causing the pointer 14 to be pivoted as the weight 15 moves forwards and rearwards on the rods 16. This means comprises an axle 20 rotatively supported within the casing 10 and extended parallel to the rods 16. The axle 20 is provided with threads 21 which threadedly engage a complementary opening extended concentrically through the weight 15. The threads 21 are extremely sharp and as the weight 15 moves forwards or rearwards compressing either the springs 17 or 18 the axle 20 will be rotated. The front end of the axle 20 carries a gear 22 in turn meshing with a second gear 23 mounted upon a rotatively supported stud shaft 24. The free end of the stud shaft 24 is extended from the face plate 12 and carries the pointer 14. Thus as the weight 15 moves forwards and rearwards the axle 21 will be rotated in one direction or the other and said rotation will be transmitted to the stud shaft 24 through the medium of the gears 22 and 23 to pivot the pointer 14 either to the right or left of the scale 13.

It is to be understood that instead of gears 22 and 23, any other driving and amplifying means may be substituted.

The operation of this portion of the invention is as follows:

The brake load indicator is mounted on the dash board 11 as shown in Fig. 1 and the rods 16 are properly adjusted to set the tension of the spring 17 and 18 to properly hold the weight 15 in a neutral position upon the rods. When set, the gauge will record the inertia of the body of the vehicle as caused by the acceleration or deceleration thereof. When such inertia is set up the weight 15 will move either forwards or rearwards compressing either the springs 17 or 18 to turn the axle 20 to similarly rotate the stud shaft 24 and move the pointer 14 across the face of the plate 12 to indicate the amount of inertia upon the calibrated scale 13.

The brake load indicator according to this invention also includes an indicating mechanism for each of the wheels 30 of the vehicle for the purpose of indicating whether or not each of the wheels is being simultaneously and evenly braked or decelerated for the purpose of stopping the vehicle. This means is comprised of a pressure gauge 31 of a conventional construction. There being one pressure gauge 31 for each of the wheels and each has a pivotally mounted pointer 32 adapted to swing to the right or left across the face of a calibrated scale 33 for the purpose of indicating the amount of inertia reacting on to each wheel as the vehicle is stopped or started.

This portion of the invention also includes a fluid container 34 mounted upon the vehicle. There is one fluid container 34 for each of the wheels 30 and each container 34 is mounted upon the vehicle in a position adjacent to its respective wheel. Each container 34 has an end discharge point 34a arranged in a straight forward line of travel of the vehicle for the purpose of causing the fluid 35 contained therein to be suddenly surged forward or rearwards with relation thereto and act upon a pressure gauge as hereinafter described. A pipe 36 connects the end point 34a of the container 34 with the entrance port 31a of the pressure gauge for causing fluid within the pressure gauge to be compressed or sucked therefrom to operate the pointer 31 as the vehicle is quickly accelerated or stopped.

This form of the invention is provided with a means for preventing the fluid from leaking from the pressure gauge 31 in the event the container 35 should be located at a point below the location of the pressure gauge 32. This means comprises an upwardly extended tube 37 which has its upper end disposed above the position of the pressure gauge 32 and which is closed by means of a plug 38. The plug 38 is provided with a by-pass 39 for permitting the air to enter and be discharged from the container 34 as the fluid 35 surges either forwards or rearwards within the container. The plug 38 is adapted to be removed from the upper end of the tube 37 for permitting the fluid 35 to be replenished in the event some should be lost or become evaporated.

The operation of this portion of the invention is as follows:

The container 34 is mounted upon the vehicle 30 adjacent its respective wheel 30 and the pressure gauge 31 for each of the containers 34 is properly positioned upon the dash board 11. The container 34 is filled with a fluid 35, preferably oil or other similar non-compressible fluid by removing the plug 38 and pouring the same through the tube 37. As the vehicle is quickly accelerated or decelerated the fluid 35 will surge either forwards or rearwards to set up pressure or suction within the gauge 31 and pivot the pointer 32 either to the right or left, depending upon the movement of the fluid.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A brake load indicator comprising a casing for attachment on a vehicle, a weight slidably mounted within said casing in a line parallel to the straight forward line of travel of said vehicle, means for resiliently holding said weight in a neutral position, an axle mounted in said casing parallel to the line of sliding of said weight and having threads threadedly engaging said weight for turning the axle as the weight moves, and an indicator connected with said axle to show the distances said axle turns, said slidable mounting comprising a plurality of spaced parallel rods extending through said casing parallel to said line of straight forward travel, each of said parallel rods being provided with a collar adjacent one end of said rods and fixedly secured thereon, said weight being formed with openings through which said rods slidably extend, said means comprising a plurality of sets of springs coaxially mounted upon said rods, one set of said springs operating between the said collars and the adjacent face of said weight, a second set of springs operating between the inner surface of said casing and the adjacent face of said weight, and means for adjusting said springs to decrease or increase the tension of said springs to more fixedly hold said weight in its neutral position.

JULES BELINKINE.